Figure 1:
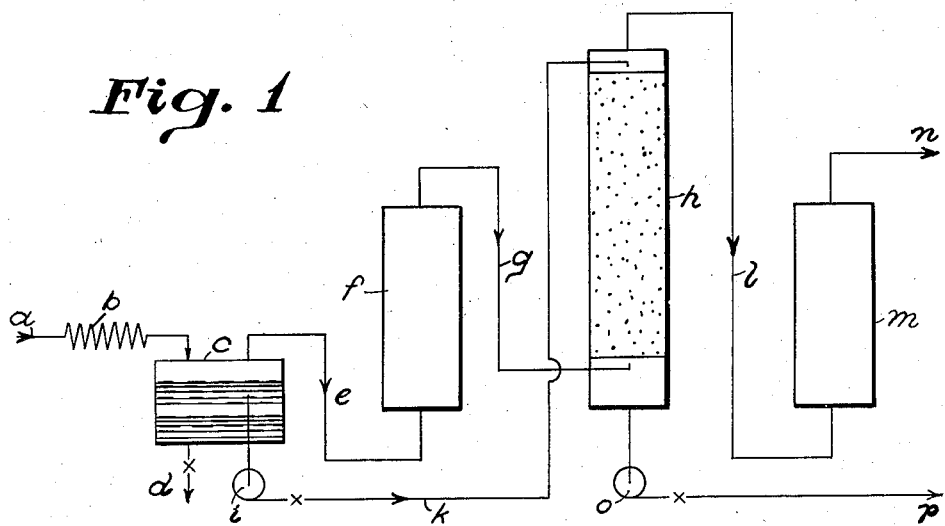

Richard Gerlach
INVENTOR

Patented Dec. 17, 1940

2,225,045

UNITED STATES PATENT OFFICE 2,225,045

PROCESS FOR THE SIMULTANEOUS DRYING OF GASES AND LIQUIDS

Richard Gerlach, Leuna, Germany, assignor, by mesne assignments, to William E. Currie, New York, N. Y.

Application August 3, 1938, Serial No. 222,761
In Germany August 4, 1937

2 Claims. (Cl. 183—119)

The present invention relates to a process for the simultaneous drying of gases and liquids.

It has already been proposed to dry gases with solid or liquid substances which are capable of absorbing water. The said substances have the greater absorption power if the gas to be dried be applied in the coldest possible state. However, when cooling gases for the said purpose, they are frequently liquefied in part, for example in the case of gases which are easy to liquefy. In special cases, as for example when drying gases which contain hydrocarbons by means of active silica, a previous partial liquefaction and separation is even necessary if the gas contains considerable amounts of higher hydrocarbons, as for example butane, the latter being otherwise absorbed by the active silica. The method of working with a partial liquefaction is therefore faced with the double problem of drying the non-liquefied and also the liquefied gas, if desired after the elimination of the water separated.

The choice of a water-absorbing substance for both gases and liquids, however, requires regard to details of so different a nature that the drying plant becomes rather involved in construction and attendance.

I have now found that where it is desired to simultaneously dry gases and liquids it is most advantageous to dry the gas, for example the gas which has not been liquefied by the cooling, with a material most suitable therefor, using the gas thus dried as a drying agent for the liquid, i. e. for the gas liquefied during the cooling, and again drying the gas which has reabsorbed moisture by a subsequent drying treatment. The process may be carried out with the use of only one gas drier. In the latter case only part of the dried gas is passed to the drying apparatus for the liquid and recirculated to the gas drier after the absorption of moisture.

With the said method of operation the drying plant is most simple as regards construction and attendance, a single substance being sufficient as a drying agent.

The process may be used in practice for example for drying hydrocarbons which it is easy to liquefy, such as ethane, propane or butane, if the same are present at the same time in the liquid and gaseous state; it is adapted also for drying extraction agents, such as sulphur dioxide. For example gaseous sulphur dioxide which occurs in the Edeleanu process is dried prior to being again liquefied, whereas the sulphur dioxide which remained in the liquid state has hitherto not been dried as a rule. By the process according to the present invention it has now become possible in a simple manner to dry both the gaseous and the liquid sulfur dioxide.

The process according to the present invention will now be more fully described with reference to Figs. 1 and 2 of the accompanying drawing which show diagrammatically two examples of apparatus in accordance with this invention. It is to be understood, however, that the invention is not restricted to the particular examples shown.

The gas mixture saturated with water vapor enters through $a$ in a warm condition; it is then cooled in a cooler $b$ and thus liquefied, still in part. The liquid formed collects in a separator $c$ wherein the liquid forms a layer over the water layer. The water thus concentrated in the lower layer is drawn off at $d$. The still moist gas passes through pipe line $e$ to the gas drier $f$, while the dry gas passes through pipe line $g$ to the drying apparatus $h$. The liquefied gas which contains moisture is withdrawn from separator $c$ and conveyed to the drying apparatus $h$ through pipe line $k$ by means of pump $i$. In apparatus $h$ constructed as a counterflow washer, the dry gas passes upwards in counter-current to the moist liquid trickling down. The gas which thus re-absorbs moisture is passed through pipe line $l$, the gas drier $m$ and, being re-dried, through pipe line $n$, while the dried liquid is conveyed through pipe line $p$ by means of pump $o$ for further use.

Figure 2:
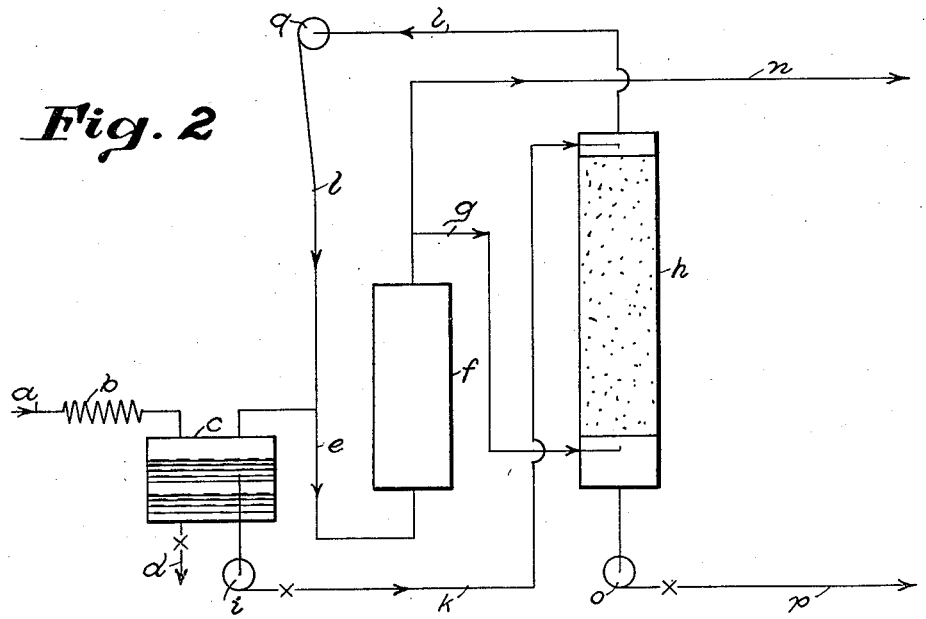

Figure 2 is a further embodiment of the process according to the present invention which differs from that illustrated in Figure 1 in that part of the dried gas is withdrawn behind the only gas drier $f$ and that the portion $g$ of the dried gas after it has been used for drying the liquid is recirculated into line $e$ through line $l$ and blower $q$ (instead of into the second gas drier $m$ in Figure 1).

The following example given with reference to the accompanying drawing, will further illustrate the nature of this invention but the invention is not restricted to this example.

Example 1000 cubic meters of a gaseous hydrocarbon mixture containing 17.0 per cent of butane and being saturated with water vapor are led in per hour at (see Fig. 1) under a pressure of 15 atmospheres and at a temperature of 39° C., and cooled down to 8° C. in the cooler $b$, whereby 31 per cent of the gas are liquefied and 3089 grams of water separated. The liquid and the water collect and separate into layers in the separator c.

The water is run off at d. The non-liquefied moist gas (694 cubic meters containing 4.3 per cent of butane and 373 grams of water) is passed through pipe line e into the drying apparatus f and dried therein by means of active silica, the dry gas then passing through pipe line g to the liquid drier h. The liquid to be dried (1.11 cubic meters containing 45.7 per cent of butane and 40 grams of water) is withdrawn from separator c and conveyed to the drying apparatus h through pipe line k by means of pump i. The gas having re-absorbed moisture (40 grams of water) then passes through pipe line l, the gas-drier m and, being redried,, through pipe line n, for further use while the dried liquid is conveyed for further use through pipe line p by means of pump o.

The moist gas leaving the drying apparatus h contains only 10.7 per cent of the amount of water vapor it would contain if it were in the saturated state.

What I claim is:

1. The process for the simultaneous drying of mixtures of gases and liquids resulting from easily liquefiable gases, which comprises partially liquefying a gaseous mixture, separating the liquefied portion from the gaseous portion, contacting said gaseous portion with a drying agent, using the gaseous portion thus dried as a drying agent for the separated liquid portion and again passing the thus moistened gas over a drying agent.

2. The process for the simultaneous drying of mixtures of gases and liquids resulting from easily liquefiable gases, which comprises partially liquefying a gaseous mixture, separating the liquefied portion from the gaseous portion, contacting said gaseous portion with a drying agent, using a part of the gaseous portion thus dried as a drying agent for the separated liquid portion and again passing the thus moistened gas over said drying agent.

RICHARD GERLACH.